Patented Dec. 25, 1951

2,580,159

UNITED STATES PATENT OFFICE 2,580,159

CHLOROSILYL BENZENES

Lee De Pree, Holland, and Arthur J. Barry and Donald E. Hook, Midland, Mich., assignors to The Dow Chemical Company, Midland, Mich., a corporation of Delaware No Drawing. Original application September 13, 1947, Serial No. 773,926. Divided and this application September 6, 1949, Serial No. 114,286

3 Claims. (Cl. 260—448.2)

This invention relates to chlorosilyl benzenes. It is an object of this invention to prepare new organosilicon compounds which are useful in the preparation of new organosiloxane resins.

This application is a division of the applicants' copending application Serial Number 773,926 filed September 13, 1947 and assigned to the same assignee as the present invention.

This invention concerns compounds of the type $C_6H_{(6-n)}(SiRCl_2)_n$ where $n$ is a whole number having a value from 2 to 5 inclusive and R is chlorine or an alkyl radical.

The compounds of this invention may be prepared by reacting a polyhalo aromatic hydrocarbon with a monohydrochlorosilane at a temperature of from 250° C. to 460° C. under sufficient pressure so that at least some of the reaction mixture is in liquid phase. Under the above conditions reaction takes place between the halogen of the hydrocarbon and the hydrogen of the silane whereby the hydrocarbon radical and silicon atom are linked together and hydrogen chloride is eliminated. The hydrogen chloride so produced reacts with more of the chlorohydrosilane to produce a more highly chlorinated silane and hydrogen. The reaction is illustrated by the following general equation:

$C_6H_{(6-n)}X_n + 2nHSiCl_2R \rightarrow$
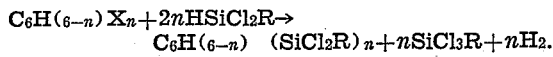
$C_6H_{(6-n)}(SiCl_2R)_n + nSiCl_3R + nH_2$.

Thus, it can be seen that each halogen of the hydrocarbon is replaced by a chlorosilyl group.

The above reaction may be carried out in various ways such as by introducing the reactants into the reaction zone under pressure or by operating under autogeneous pressure in a closed system. Frequently one or more of the reactants is normally liquid at the reaction temperatures and serves as a solvent for the other starting materials. Under such conditions the reaction may proceed at relatively low pressure such as a gauge pressure of five atmospheres or less.

As can be seen from the above equations, it is advantageous to employ two mols of the halosilane for each halogen atom in the hydrocarbon. However, much greater or smaller relative proportions of the reactants may be employed if desired.

When the products of this invention are hydrolyzed by any of the well known methods employed to hydrolyze halosilanes, resinous materials are formed which contain both Si—O—Si and Si—R—Si linkages. Such resins possess valuable properties which are not common to those resins containing only Si—O—Si bonds.

The following examples are illustrative only.

Example 1

A mixture comprising 441 grams of orthodichlorobenzene and 813 grams of trichlorosilane was heated in a 2.4 liter bomb for 12 hours at 370°–382° C., and a maximum pressure of 1600 pounds per square inch. The products were collected and fractionally distilled. There were obtained 375 grams of silicon tetrachloride, $SiCl_4$; 299 grams of chlorophenyltrichlorosilane,

$ClC_6H_4SiCl_3$ 105 grams of phenyltrichlorosilane, and several grams of material distilling within the range of from 140.5° to 149° C. at 10 millimeters absolute pressure. This material comprised a mixture of crystalline and liquid isomers of bis(trichlorosilyl)benzene. p - Bis(trichlorosilyl)benzene is crystalline at ordinary temperatures, and distills at 168° C. at 30 millimeters absolute pressure. An isomer, liquid at room temperature, distills at about 161.5° C. at 30 millimeters.

Example 2

A mixture comprising 1765 grams of paradichlorobenzene and 2760 grams of methyldichlorosilane, $CH_3SiHCl_2$, was heated in a bomb of 3.8 gallon capacity for 16 hours at a temperature of from 395° to 410° C. The maximum pressure attained within the bomb was 1350 pounds per square inch. Fractional distillation of the reaction product yielded 444 grams of phenylmethyldichlorosilane, $C_6H_5(CH_3)SiCl_2$, 347 grams of (chlorophenyl)methyldichlorosilane,

$ClC_6H_4(CH_3)SiCl_2$ 1946 grams of methyltrichlorosilane, $CH_3SiCl_3$, and 455 grams of a mixture of bis(methyldichlorosilyl)benzenes distilling within the range of from 164° to 169° C. at 30 millimeters. p-Bis-(methyldichlorosilyl)benzene crystallized from the latter cut. It is crystalline at room temperature, and has a boiling point of 169° C. at 30 millimeters absolute pressure. The liquid portion of the cut is an isomer of the para-derivative, and distills at 164.5°–165.0° C. at 30 millimeters. Unreacted paradichlorobenzene was recovered.

That which is claimed is:

1. $C_6H_4(SiRCl_2)_2$ where R is selected from the group consisting of alkyl radicals and chlorine.
2. Bis-trichlorosilylbenzene.
3. p-Bis-trichlorosilylbenzene.

LEE DE PREE.
ARTHUR J. BARRY.
DONALD E. HOOK.

REFERENCES CITED

The following references are of record in the file of this patent:

UNITED STATES PATENTS

| Number | Name | Date |
|---|---|---|
| 2,383,817 | Rochow | Aug. 28, 1945 |
| 2,499,561 | Barry | Mar. 7, 1950 |
| 2,500,652 | Barry | Mar. 14, 1950 |
| 2,511,820 | Barry et al. | June 13, 1950 |

OTHER REFERENCES

Gruttner et al., Berichte der Deut. Chim. Ges., vol. 51 (1918), pages 1283–1292.